United States Patent [19]
Ohira

[11] Patent Number: 5,453,896
[45] Date of Patent: Sep. 26, 1995

[54] TAPE CASSETTE WITH COORDINATED FRONT AND REAR LIDS AND A FRONT RIM MEMBER FOR PROTECTION OF THE TAPE AND A ROTATABLE LEVER CONNECTING THE LIDS

[75] Inventor: Tsunehisa Ohira, Sagamihara, Japan

[73] Assignee: Victor Company of Japan, Ltd., Yokohama, Japan

[21] Appl. No.: 195,752

[22] Filed: Feb. 10, 1994

Related U.S. Application Data

[63] Continuation-in-part of Ser. No. 980,978, Nov. 24, 1992, Pat. No. 5,404,261.

[30] Foreign Application Priority Data

Feb. 10, 1993 [JP] Japan .................................. 5-045944
Feb. 10, 1993 [JP] Japan .................................. 5-045945

[51] Int. Cl.$^6$ .................................................. G11B 23/02
[52] U.S. Cl. ...................................... 360/132; 242/347.1
[58] Field of Search ................................... 360/132, 134, 360/94, 96.5; 242/347.1, 347

[56] References Cited

U.S. PATENT DOCUMENTS

| | | | |
|---|---|---|---|
| 4,685,016 | 8/1987 | Baranski | 360/132 |
| 5,065,955 | 11/1991 | Fujii | 360/132 |

FOREIGN PATENT DOCUMENTS

| | | |
|---|---|---|
| 129844 | 1/1985 | European Pat. Off. . |
| 427476 | 5/1991 | European Pat. Off. . |
| 452148 | 10/1991 | European Pat. Off. . |
| 465112 | 1/1992 | European Pat. Off. . |
| 03235279 | 10/1991 | Japan . |

2243144  10/1991  United Kingdom .

OTHER PUBLICATIONS

Japanese Patent Publ. No. 63-18271 by Sony Corp. publ. on Apr. 18, 1988. (Japanese Laid-Open Patent Publ. No. 61-210587/1986 publ. on Sep. 18, 1986.) Title: "Tape Cassette".

Japanese Patent Publ. No. 63-16826 by Sony Corp. Publ. on Apr. 11, 1988. (Japanese Laid-Open Patent Publ. No. 58-128069/1983 publ. on Jul. 30, 1983.) Title: "Tape Cassette".

Japanese Patent Publ. No. 63-16824 by Sony Corp. publ. on Apr. 11, 1988. (Japanese Laid-Open Patent Publ. No. 57-210489/1982 publ. on Dec. 24, 1982.) Title: "Tape Cassette".

Primary Examiner—Stuart S. Levy
Assistant Examiner—Kevin M. Watkins
Attorney, Agent, or Firm—Michael N. Meller

[57] ABSTRACT

The present invention discloses a tape cassette having a front lid for protecting a magnetic surface of a magnetic tape accommodated in a casing made of upper and lower half members against dust or the like and a rear lid for protecting the back surface of the magnetic tape. The front lid is rotatably supported at sides of the casing. The rear lid is rotatably suspended on a connecting lever which is rotatably supported on the front lid. The magnetic tape is protected between the front and rear lids in a lid closed state. A pair of pins provided on the rear lid is snugly fitted in a pair of guide grooves formed in projections provided in the lower half member so that the rear lid may move in opening and closing directions. The guide grooves have open tops so that the pins of the rear lid are easily inserted into the guide grooves in the assembly process. The open tops are covered with front rims provided on the upper half member in the assembly process.

5 Claims, 10 Drawing Sheets

TAPE CASSETTE WITH COORDINATED FRONT AND REAR LIDS AND A FRONT RIM MEMBER FOR PROTECTION OF THE TAPE AND A ROTATABLE LEVER CONNECTING THE LIDS

The present application is a continuation-in-part application from U.S. patent application Ser. No. 07/980,978 filed on Nov. 24, 1992 (now U.S. Pat. No. 5,404,261) and assigned to the assignee of the present application.

BACKGROUND OF THE INVENTION

1. Field of the Invention

The present invention relates to a tape cassette for use with a magnetic recording and/or reproducing apparatus. Particularly, the present invention relates to a tape cassette having front and rear lids for protecting a loaded magnetic tape against dust and having its rear lid suspended from the front lid by means of a connecting lever.

2. Description of the Related Art

A tape cassette to be used with a magnetic recording and/or reproducing apparatus such as a video tape recorder is exemplified by a VHS standard tape cassette having a tape width of ½ inch, or by an 8 mm tape cassette having a tape width of 8 mm, as is well known in the prior art.

Figure 1A:
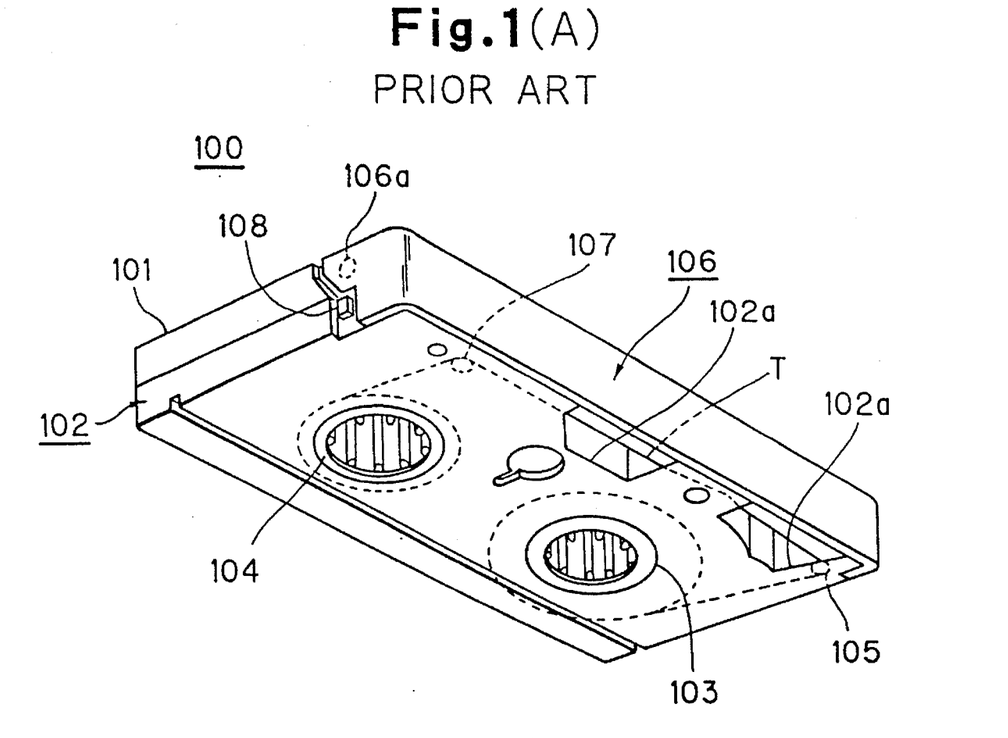
FIG. 1(A) is a perspective view of the VHS standard tape cassette of the prior art.
Figure 1B:
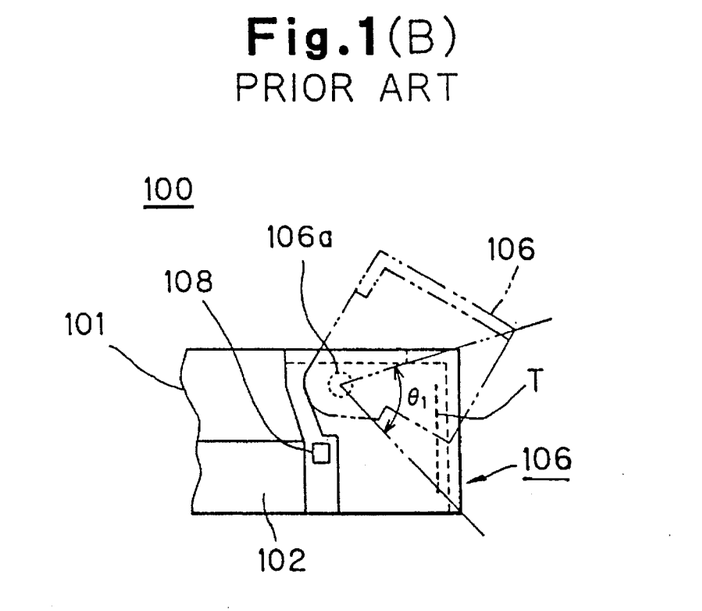
FIG. 1(B) is a side view for explaining a lid opening action of the VHS standard tape cassette of FIG. 1(A)

FIG. 1(A) is a perspective view of the VHS standard tape cassette, and FIG. 1(B) is a side view for explaining a lid opening action of the VHS standard tape cassette.

A VHS tape cassette 100, as shown in FIGS. 1(A) and 1(B), is assembled from an upper half member 101 and a lower half member 102 into a box-shaped casing. This VHS standard tape cassette 100 is used to perform recording and/or reproducing operations by not-shown magnetic recording and/or reproducing apparatuses. For these operations, the VHS standard tape cassette 100 has its external size and shape generally standardized to keep interchangeability with the apparatus.

Moreover, a magnetic tape T is made to move between a supply reel 103 and a take-up reel 104, which are disposed in the VHS standard tape cassette 100. The magnetic tape T wound on the supply reel 103 is guided around a supply side guide pole 105 and along a front lid 106 disposed at openings 102a of the lower half member 102 and is guided around a take-up side guide pole 107 so as to be taken-up on the take-up reel 104.

The openings 102a of the lower half member 102 is opened at its bottom for permitting tape loading members (not-shown) of the apparatus.

On the other hand, the front lid 106 is provided for protecting the magnetic face of the magnetic tape T against dust and finger-prints or the like. This front lid 106 is so supported at the right-hand and left-hand sides of the tape cassette 100 that it can be opened or closed on a pair of pins 106a and 106a (although only one is shown) integrated with the inner side of the right-hand and left-hand sides of the front lid 106. However, the front lid 106 is retained and closed by a front lid lock member 108 disposed at the left-hand side of the tape cassette 100.

Referring to FIG. 1(B), only when the VHS standard tape cassette 100 is inserted into the (not-shown) magnetic recording and/or reproducing apparatus, the front lid lock member 108 is released by a lid opening device of the apparatus so that the front lid 106 is opened on the pins 106a formed on the front lid 106, as indicated by double-dotted lines. At this time, an opening angle $\theta_1$ of the front lid 106 is not so large for a small-sized, lightweight portable apparatus but is sufficiently large for a large-sized tape deck or professional-use apparatus.

With the front lid 106 being opened, the apparatus is loaded with the magnetic tape T along its predetermined tape path by the (not-shown) tape loading members entered into the openings 102a.

Figure 2A:
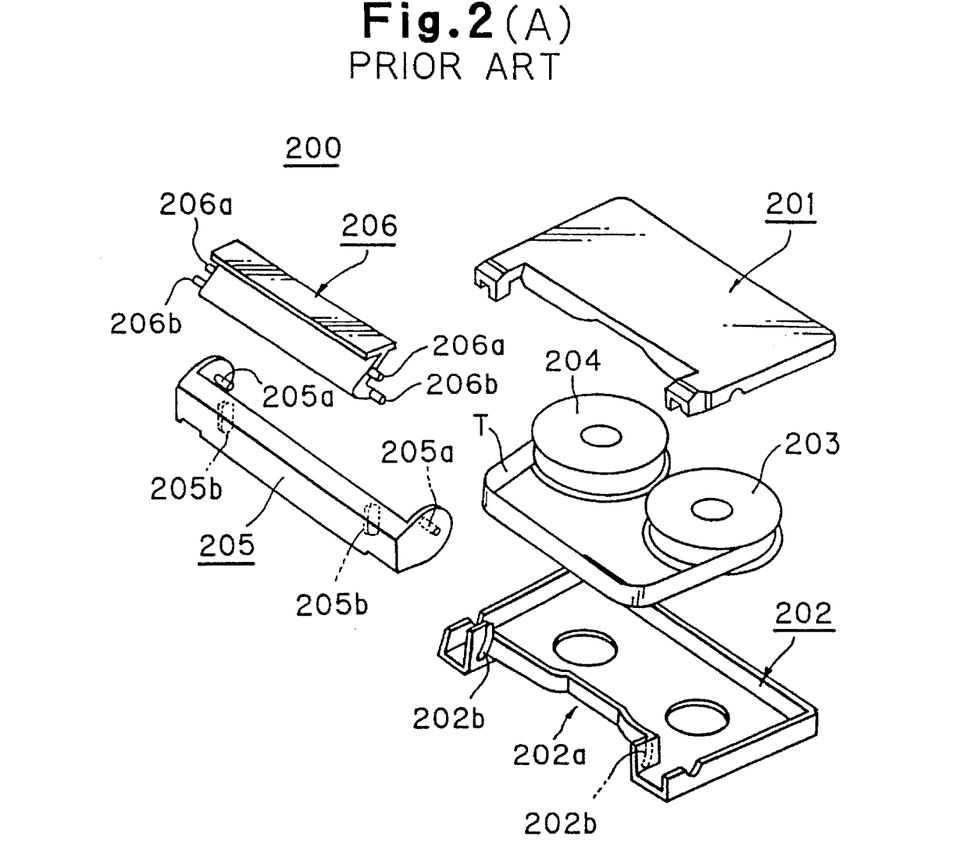
FIG. 2(A) is a perspective view of the 8 mm tape cassette of the prior art.
Figure 2B:
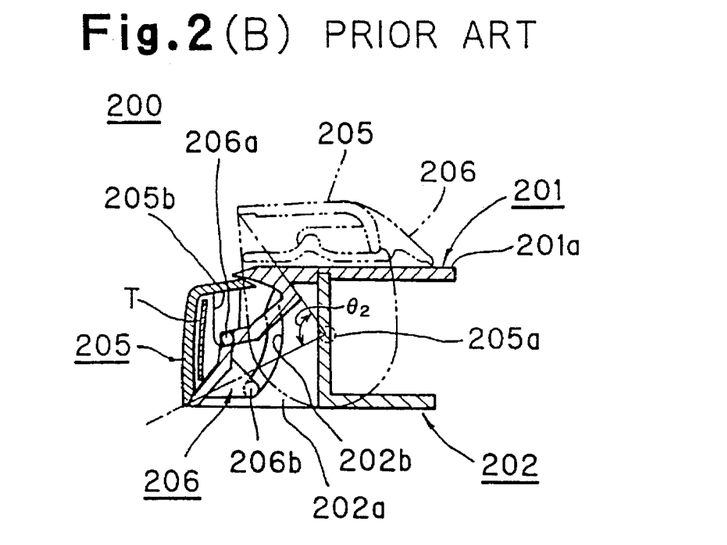
FIG. 2(B) is a side view for explaining a lid opening action of tile 8 mm tape cassette of FIG. 2(A)

FIG. 2(A) is a perspective view of the 8 mm tape cassette of the prior art and FIG. 2(B) is a side view for explaining a lid opening action of the 8 mm tape cassette.

On the other hand, the 8 mm tape cassette, 200 as shown in FIG. 2(A) and 2(B), has a construction substantially similar to the aforementioned one and is assembled of upper and lower half members 201 and 202 into a box-shaped casing, which is equipped therein with a supply reel 203 and a take-up reel 204 for causing the magnetic tape T to move. At an opening 202a provided on the lower half member 202 and at the back of a front lid 205, there is disposed a rear lid 206 for protecting the back face of the magnetic tape T, the side opposite to the magnetic tape.

This 8 mm tape cassette 200 is disclosed in the Japanese Laid-Open Patent Publication No. 168979/1984. Here will be briefly described in the vicinity of the front lid 205 and the rear lid 206. Along the front lid 205 which is disposed at the side of the opening 202a of the lower half member 202, there is guided the magnetic tape T which is protected while being interposed between the front lid 205 and the rear lid 206.

Specifically, the front lid 205 is so supported at the right-hand and left-hand sides of the upper and lower half members 201 and 202 that it can be freely opened or closed on a pair of pins 205a and 205a formed integrally with the inner walls of the right-hand and left-hand sides thereof. From the middle portion of the front lid 205, on the other hand, there concurrently depend a pair of projections 205b and 205b, which rotatably support the generally "T-shaped" rear lid 206 such that the rear lid 206 can rotate by means of a pair of pins 206a and 206a integrated therewith.

From the lower ends of the right-hand and left-hand sides of the rear lid 206, there are concurrently projected a pair of guide pins 206b and 206b. These guide pins 206b and 206b are fitted in a pair of guide grooves 202b and 202b which are formed in the right-hand and left-hand sides of the opening 202a of the lower half member 202.

Only when a not-shown magnetic recording and/or reproducing apparatus is loaded with the 8 mm tape cassette 200, as shown in FIG. 2(B), the front lid 205 and the rear lid 206 are opened together by a lid opening device of the apparatus, rotating around the supporting pins 205a formed on the front lid 205 which opens, as indicated by double-dotted lines.

Here, the rear lid 206 is opened concurrently and associatively with the opening action of the front lid 205 to a position of a large open angle $\theta_2$ above the upper face 201a of the upper half member 201. In this moment, the rear lid 206 is opened upward on its pins 206a, with the guide pins 206b guided in the guide grooves 202b formed in the lower half member 202.

In recent years, the magnetic tape T is required to undergo the recording and/or reproducing operations in a high density with excellent performance quality. At the present stage, moreover, the recording and playing operations can be digitally effected, the recording and/or reproducing qualities are apt to be seriously deteriorated if the magnetic tape T becomes dusty or is stained with fingerprints.

In the aforementioned VHS tape cassette 100, the magnetic tape T does not have its magnetic face and opposite back face being physically protected. As a result, if the magnetic tape T has its back face contaminated with dust coming from the openings 102a or erroneously or accidentally stained with the fingerprints through the openings 102a, its back face may come into close contact with its magnetic face to cause malfunctions when it is wound on the supply reel 103 or the take-up reel 104.

It is, therefore, considered that a member corresponding to the disclosed rear lid (206) of the aforementioned 8 mm tape cassette 200 is attached to the VHS tape cassette 100. However, the not-shown magnetic recording and/or reproducing apparatus adopting the VHS tape cassette 100 has already been widely used in the relevant field. Considering the interchangeability between the VHS tape cassette 100 and the apparatus, the following problems (1) and (2) will arise to the users seriously, if the construction of the 8 mm tape cassette 200 is applied to the VHS tape cassette 100 as it is. Thus, it is difficult to adopt the member corresponding to the rear lid (206) into the existing construction.

(1) In the apparatus of the type such as a portable video deck or a video movie, the front lid has its open angle designed to the minimum so as to reduce the size. In case, therefore, the member corresponding to the rear lid (206) of the aforementioned construction of the 8 mm tape cassette 200 adopted, that member can not be opened sufficiently and will collide with the tape loading members for extracting the magnetic tape T into the apparatus.

(2) In the apparatus of the type such as a large-sized video deck or a video deck for professional use, on the other hand, the open angle of the front lid is designed to a sufficient value. In case, therefore, the member corresponding to the rear lid (206) of the construction of the aforementioned 8 mm tape cassette 200, the guide pins (206b, 206b) of the member corresponding to the rear lid (206) will come upward out of the guide grooves (202b, 202b) and be damaged when the member corresponding to the rear lid (206) is closed.

In short, the rear lid opening/closing structure associated with the front lid has to be reliably applicable in its basic construction not only to the apparatus having a large front lid open angle but also to the apparatus having a small front lid open angle, no matter how much its external shape might be different. Thus, there has been desired a tape cassette which can satisfy that condition.

SUMMARY OF THE INVENTION

Accordingly, a general object of the present invention is to provide a novel and useful tape cassette in which the above disadvantage has been eliminated.

A more specific object of the present invention is to provide a tape cassette having a casing including an opening for accepting tape loading members of a magnetic recording and/or playing apparatus, a pair of reels disposed in the casing for winding a magnetic tape on the pair of reels and threading the magnetic tape along a front of the opening, a front lid disposed in openable/closable manners at the front of the casing for protecting one surface of the magnetic tape and a rear lid disposed over the opening and at a back of the front lid for protecting another surface of the magnetic tape, wherein the tape cassette comprises, pin means provided on the rear lid, guide groove means provided on a lower half member of the casing for guiding the rear lid in opening and closing directions of the rear lid by being slidably fitted with the pin means of the rear lid, the guide groove means having an open top, and a front rim member provided on an upper half member of the casing for covering the open top of the guide.

Another specific object of the present invention is to provide a tape cassette having a casing including an opening for accepting tape loading members of a magnetic recording and/or playing apparatus, a pair of reels disposed in the casing for winding a magnetic tape on the pair of reels and threading the magnetic tape along a front of the opening, a front lid disposed in openable/closable manners at the front of the casing for protecting one surface of the magnetic tape and a rear lid disposed over the opening and at a back of the front lid for protecting another surface of the magnetic tape, wherein the tape cassette comprises, pin means provided in the rear lid, connecting lever means rotatably supported on the front lid substantially parallel to a longitudinal direction of the front lid by first level posture holding means, the rear lid being rotatably suspended on the connecting lever means in parallel to the front lid by second level posture holding means at the back of the front lid, guide groove means provided on a lower half member of the casing for guiding the rear lid in opening and closing directions of the rear lid by being slidably fitted with the pin means of the rear lid, bias means for biasing the rear lid suspended from the connecting lever in a rear lid opening direction, and regulating means formed in the casing for regulating an opening action of the rear lid biased by the bias means when the front lid and the rear lid are closed.

BRIEF DESCRIPTION OF THE DRAWINGS

FIGS. 6(A), 6(B), 6(C) and 6(D) are vertical sections taken in the direction of arrows X and Y of FIG. 5(A) for explaining the lid opening actions of the tape cassette according to the first embodiment of the present invention, wherein FIG. 6(A) is a side view showing the state in which the front lid and the rear lid are closed;

DETAILED DESCRIPTION OF THE PREFERRED EMBODIMENTS

The tape cassette according to the present invent i on will be described in the following in connection with the embodiments thereof with reference to FIGS. 3 to 8. This description will be made in detail individually for the embodiments in the order of the items of <Construction of Tape Cassette> and <Lid Opening Action of Tape Cassette>.

Construction of Tape Cassette according to First Embodiment

Figure 3:
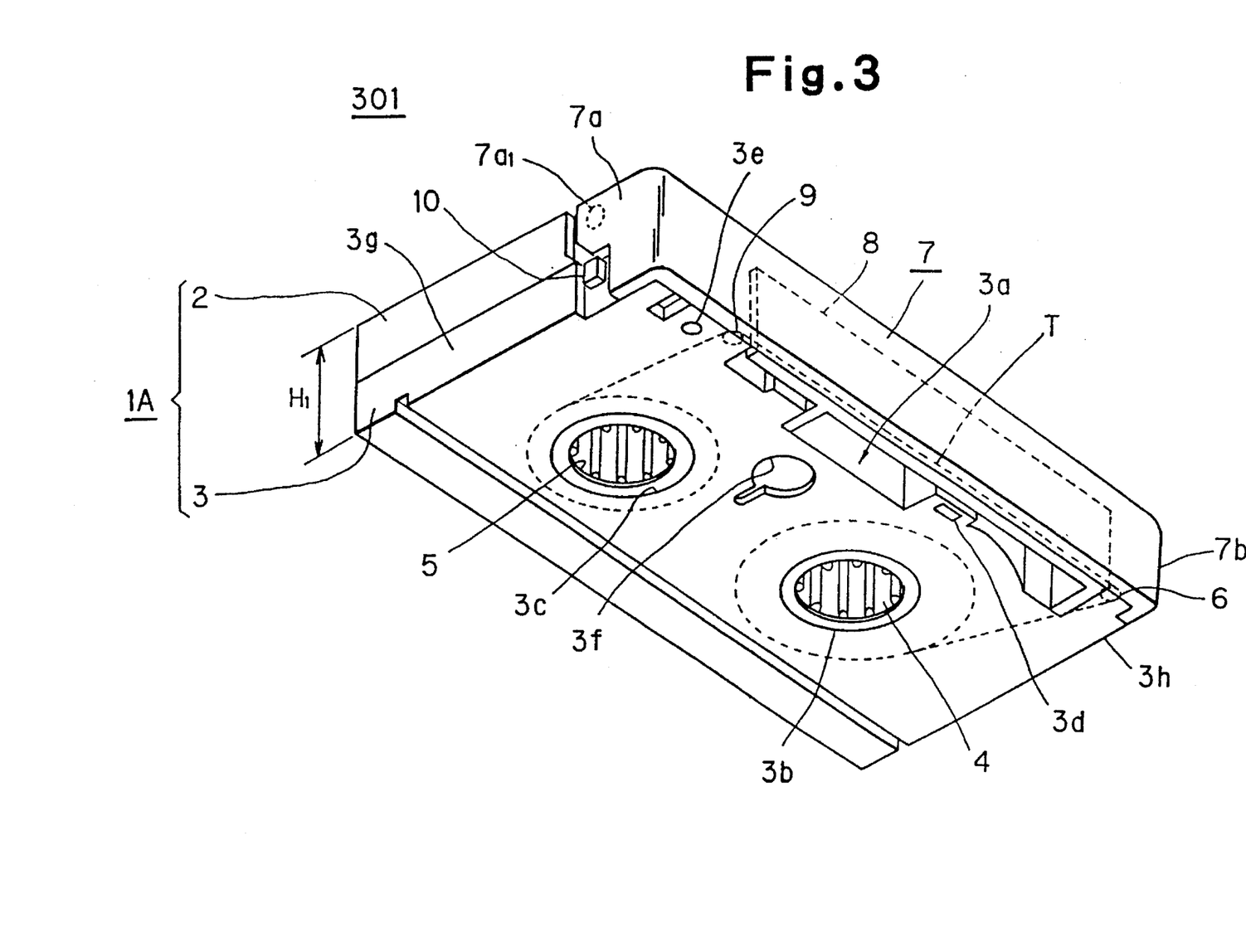
FIG. 3 is a perspective view showing the entire construction of a tape cassette according to the first embodiment of the present invention.
Figure 4:
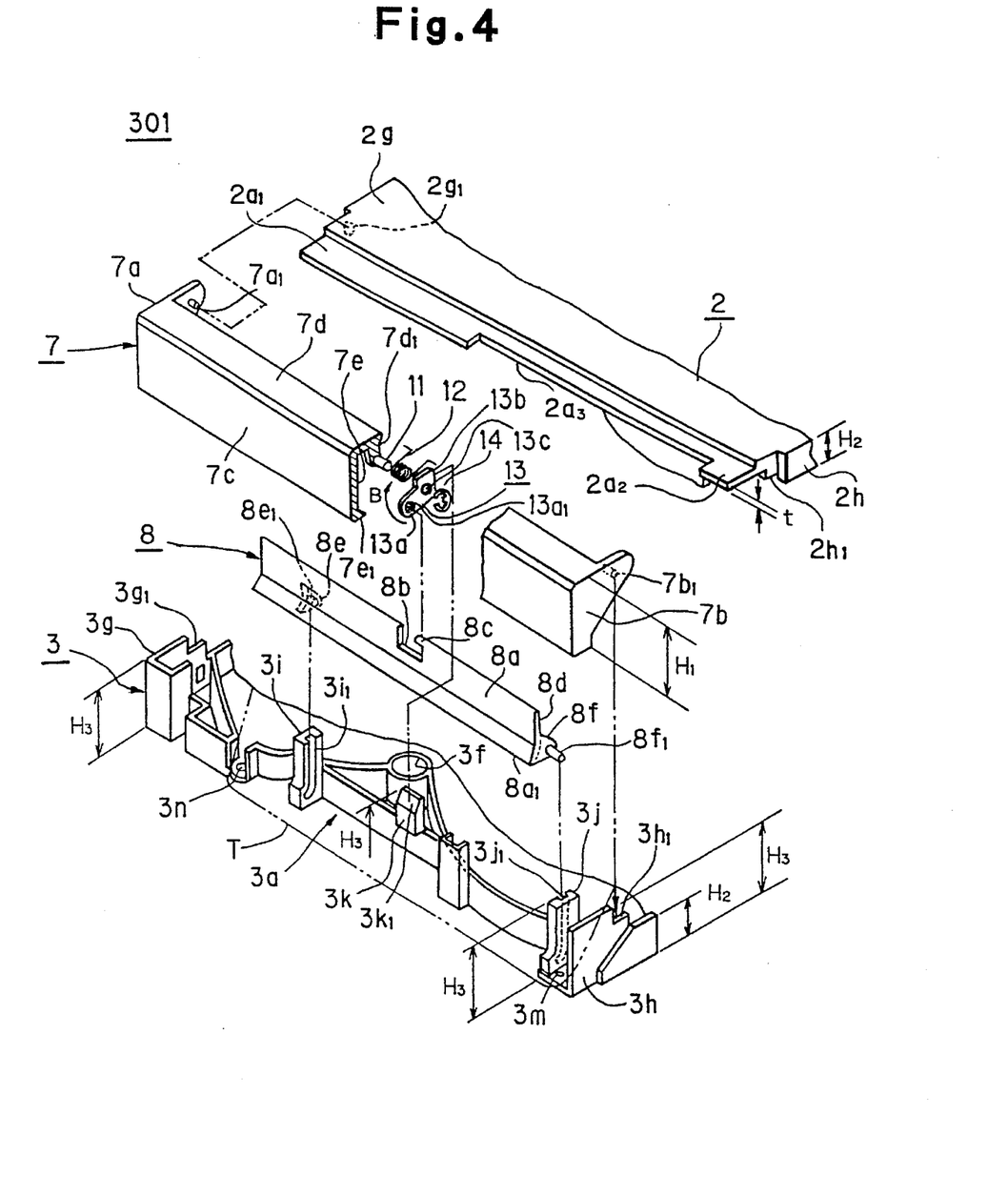
FIG. 4 is, partially broken, an exploded perspective view of the area of a front lid and a rear lid and their vicinity constituting an essential portion of the tape cassette according to the first embodiment of the present invention.
Figure 5A:
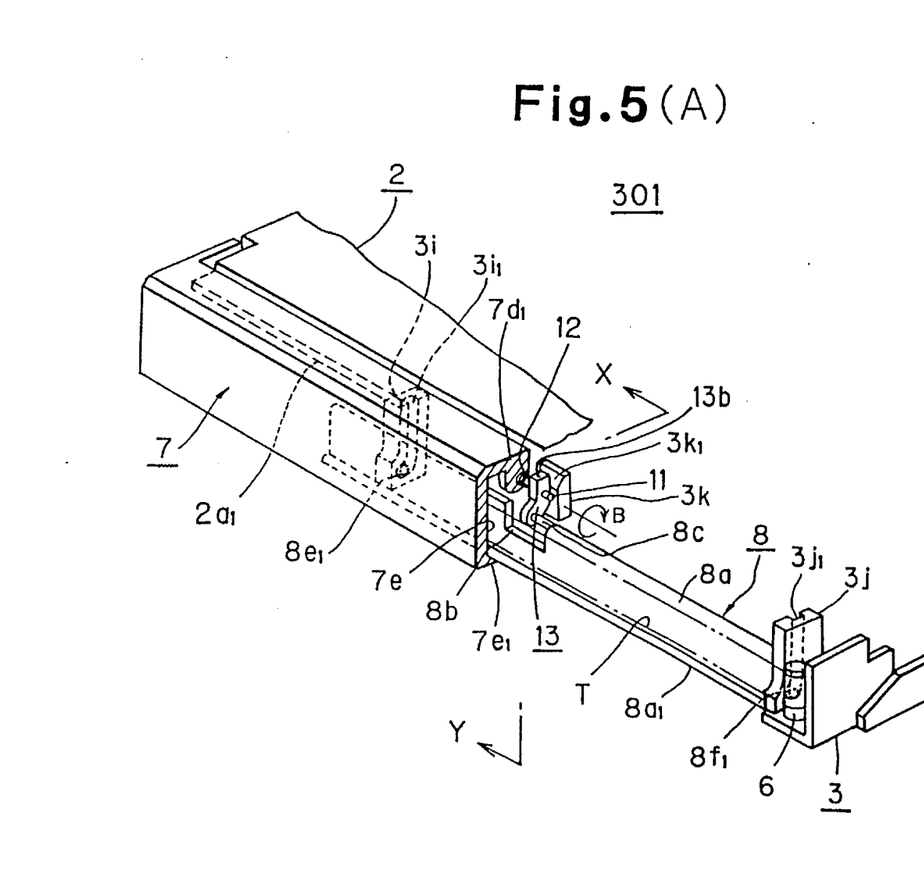
FIG. 5(A) is a partially broken perspective view, in an assembled state, of the area in the vicinity of the front lid and the rear lid constituting the essential portion of the tape cassette according to the first embodiment of the present invention.

FIG. 3 is a perspective view showing the entire construction of a tape cassette according to the first embodiment of the present invention; FIG. 4 is, partially broken, an exploded perspective view of the area of a front lid and a rear lid and their vicinity constituting an essential portion of the tape cassette according to the first embodiment of the present invention; FIG. 5(A) is a partially broken perspective view in an assembled state, of the area in the vicinity of the front lid and the rear lid constituting the essential portion of the tape cassette according to the first embodiment of the present invention; and FIG. 5 (B) is a partially enlarged view of the FIG. 5(A).

A tape cassette 301 which is common to the first and second embodiments of the present invention, as shown in FIG. 3, is halved into an upper half member 2 and a lower half member 3 of a resin material such that the upper half member 2 and the lower half member 3 are assembled into a box-shaped casing 1A. This casing 1A is equipped therein with a supply reel 4 and a take-up reel 5, between which is made to move a magnetic tape T. The magnetic tape T wound on the supply reel 4 is guided, after having passed around a guide pole 6 (as clearly shown in FIG. 5(B)) at the supply side, through a gap between a front lid 7 and a rear lid 8, which are disposed at the front side of an opening 3a provided at a bottom of the lower half member 3, and is taken up by the take-up reel 5 after having passed a guide pole 9 at the take-up side.

The opening 3a of the lower half member 3 admits a tape loading member (not-shown) of a magnetic recording and/or reproducing apparatus. In addition to this opening 3a, the lower half members 3 are provided on its bottom: with holes 3b and 3c, which are aligned correspondingly with the supply reel 4 and the take-up reel 5: with positioning holes 3d and 3e located in the vicinity of the opening 3a for positioning the tape cassette 301 in the apparatus: and with a hole 3f for accepting a (not-shown) light emitting element for detecting the loaded state of the magnetic tape T.

The aforementioned front lid 7 is supported in openable and closable manners on the left-hand and right-hand sides 3g and 3h of the casing 1A by means of a pair of pins $7a_1$ and $7b_1$ (although only the pin $7a_1$ is explicitly shown) which are formed integrally with the inner walls of the right-hand and left-hand sides 7a and 7b of the front lid 7. Before the apparatus is loaded with the tape cassette 301, the front lid 7 is retained by a front lid lock member 10 which is disposed on the left-hand side 3g of the lower half member 3, so that it is kept to be closed state. Moreover, the front lid 7 protects one face (as will be called the "magnetic face") of the magnetic tape T, when it is closed, against dust and finger touches.

Incidentally, the opening action of the front lid 7 is allowed only when the tape cassette 301 is loaded into the (not-shown) magnetic recording and/or reproducing apparatus. At this time, the front lid lock member 10 is released by the lid opening device of the apparatus to allow the front lid 7 to be opened, but a detailed description is omitted here.

On the other hand, the aforementioned rear lid 8, which is one of the essential constructive members of the present invention, is located at the back of the magnetic tape T loaded along the front lid 7, and is opened or closed together with the opening/closing actions of the front lid 7.

This rear lid 8 is provided for protecting the back face of the magnetic tape T, which is opposite to the magnetic face, against the dust. The back face is otherwise accessible through the opening 3a provided in the lower half member 3, thus is liable to collect fingerprints. The rear lid 8 further protects the magnetic tape T itself from being scratched by foreign objects which may come through the opening 3a.

Here will be described major structural members constituting the essential portion of the present invention for supporting in openable and closable manners the front lid 7 and the rear lid 8 connected to the front lid 7 with reference to FIG. 4.

As shown in FIG. 4, with some exceptional portions the upper half member 2 and the lower half member 3 are individually formed and are separated at a height $H_2$ which is about one half of the height $H_1$ of the front lid 7 being substantially equal to that of the tape cassette 301.

Further, the upper half member 2 is protrudingly formed with front rims $2a_1$, $2a_2$ each having a thin thickness of "t", which are essential constructive portions of the present invention, at the front thereof. These front rims $2a_1$, $2a_2$ of the upper half member 2 have a function for covering open tops of guide grooves $3i_1$, $3j_1$ defined in projections $3i$, $3j$ formed on the lower half member 3 by being inserted along a bottom of an upper side 7d of the front lid 7 so as to contact with the upper portions of the projections $3i$, $3j$ when the upper and lower half members 2, 3 are assembled, as described hereinafter. Furthermore, the upper half member 2 is formed with a recess $2a_3$ between the left-hand front rim $2a_1$ and the right-hand front rim $2a_2$ so as to allow the rear lid 8 to open.

Moreover, front portions of the left-hand and right-hand sides 3g, 3h of the lower half member 3 have a height $H_3$ slightly lower than the height $H_1$ of the front lid 7 and the left-hand and right-hand sides 3g, 3h are formed with a pair of opposed stepped portions $3g_1$ and $3h_1$ having a height slightly lower than $H_3$ of the front portion. Further, the portions behind the stepped portions $3g_1$, $3h_1$ have respectively a height $H_2$ substantially equal to one half of the height $H_1$ of the tape cassette 301.

When the upper half and lower half members 2, 3 are assembled into the casing 1A supporting the front lid 7 thereby, the front lid 7 is supported by the casing 1A by causing the left-hand pin $7a_1$ of the front lid 7 to be inserted into a hole $2g_1$ defined at the left-hand side 2g of the upper half member 2, and by causing the right-hand pin $7b_1$ of the front lid 7 to be interposed between a stepped portion $2h_1$ formed on the upper half member 2 and the stepped portion $3h_1$ of the lower half member 3 as described thereafter.

Thus, the front lid 7 is supported in the openable and closable manners on the pins $7a_1$ and $7b_1$ in front of the casing 1A.

On the other hand, the lower half member 3 is formed in its front side with the opening 3a having such a space to accept the (not-shown) tape loading members. At the right-hand and left-hand inner sides of the opening 3a, there are formed a pair of projections 3i and 3j, which are spaced and opposed to each other. These projections 3i and 3j project upward with the height $H_3$ which is slightly lower than the height $H_1$ of the front lid 7. The projection 3i is offset slightly to the left-hand side of the center portion of the lower half member 3, whereas the projection 3j is located in the vicinity of the right-hand side 3h. The paired projections 3i, 3j are provided in the opening 3a in such a manner that the rear lid 8 is openable without abutting on the paired projections 3i, 3j in the lid opening action as described hereinafter.

Moreover, the paired projections 3i and 3j which are constructing ones of the major constructive members of the present invention, are formed with a pair of opposing guide portions $3i_1$ and $3j_1$ (as will be referred to as the "guide grooves") which are "boot-shaped" grooves each having an open top and a closed bottom respectively. In these paired guide grooves $3i_1$ and $3j_1$, there can be snugly and slidably fitted (in engagement) pins $8e_1$ and $8f_1$ which are formed on the rear lid 8.

In assembly process, after the pins $8e_1$, $8f_1$ of the rear lid 8 are inserted into the paired guide grooves $3i_1$, $3j_1$ form the open tops thereof, the open tops of the guide grooves $3i_1$, $3j_1$ are covered by the front rims $2a_1$, $2a_2$ of the upper half member 2 by causing the upper half member 2 to be placed in stacked manner on the lower half member 3. Thus, the pins $8e_1$, $8f_1$ of the rear lid 8 are prevented from coming out from the open tops of the paired guide grooves $3i_1$, $3j_1$.

As mentioned above, it will be understood that the rear lid 8 of the present invention is easily assembled into the tape cassette 301 in the assembly process thanks to the provision of the open tops of the paired guide grooves $3i_1$, $3j_1$, and is sufficiently opened in operation without slipping off from the paired guide grooves $3i_1$, $3j_1$ and the front rims $2a_1$, $2a_2$ of the upper half member 2 for covering the open tops.

Moreover, at an approximate center of the lower half member 3 and inside of the opening 3a, and between the left-hand projection 3i and the right-hand projection 3j, there is formed a regulate portion 3k (as will be referred to as the "lever guide portion 3k") which is projected upward to have the height $H_3$ slightly lower than the height $H_1$ of the front lid 7. The lever guide portion 3k has its upper leading end portion tapered, as at $3k_1$. This tapered portion $3k_1$ can be abutted by an abutment portion 13b of a connecting lever 13, which is supported by the front lid 7, as will be described hereinafter, so that it regulates the rotation of the connecting lever 13 when in the lid closing action.

On the other hand, the bottom of the lower half member 3 is formed at its front side with holes 3m and 3n, in which the guide poles 6 and 9 (as shown in FIG. 3) are planted, so that the magnetic tape T is threaded to form a tape path, as indicated by double-dotted lines, by the guide poles 6 and 9. Behind of the lever guide portion 3k, on the other hand, there is formed the aforementioned hole 3f, which allows a(not-shown) light emitting element to enter. The hole 3f is located generally at the center portion of the lower half member 3.

The aforementioned left-hand and right, hand sides 3g and 3h, projections 3i and 3j and lever guide portion 3k formed at the lower half member 3 are structures to be associated with the opening actions of the front lid 7 and the rear lid 8, so that they are formed integrally with the lower half member 3 with the height $H_3$ slightly lower than the height $H_1$ of the front lid 7 so as to keep excellent positioning accuracies of the front lid 7 and the rear lid 8. These components are associated with the front rims $2a_1$, $2a_2$ having a thickness "t".

Next, there provided a front side 7c extended vertically from the upper side 7d and connected at both ends thereof to the right-hand and left-hand sides 7a and 7b of the front lid 7, so that an "inverted L-shape" in cross section is formed, and the front side 7c has its lower end slightly extended to form a triangular (sectional view) portion $7e_1$ at a back side 7e. The triangular portion $7e_1$ has a function to cover the lower end of the magnetic tape T, which is loaded along the front lid 7, in a sealed state together with a later-described lower end portion $8a_1$ of the rear lid 8, when in the lid closing action. Thus, the triangular portion $7e_1$ protects the magnetic tape T in a state isolated from the opening 3a.

At the back side of the center portion of the front lid 7, on the other hand, there depends from the back of the upper side 7d a support portion $7d_1$ (as will be referred to as the "lever support portion $7d_1$"), having a shaft 11. To this shaft 11, moreover, there is hinged the connecting lever 13, which is urged by a torsion spring 12 to rotate on the shaft 11 in the clockwise direction (i.e., in the direction of arrow B) of the drawing. The connecting lever 13 has a function to increase a degree of freedom of motion of the rear lid 8 as described hereafter. In other words, the shaft 11 is fixedly provided at the lever supporting portion $7d_1$ of the front lid 7.

More specifically, the connecting lever 13 is made of resin in the dog-leg shape, and has a center hole 13c defined approximately at a center thereof, an arm member 13a protrudingly provided therefrom toward the back side 7e of the front lid 7 and the abutment portion 13b protruding provided upward therefrom. Further, a hole $13a_1$ is defined at an distal end of the arm member 13a in parallel to the center hole 13c. In assembly, the shaft 11 is inserted with the torsion spring 12 and with the center hole 13c of the connecting lever 13 from the right-hand side in this order and is fitted with a snap ring 14 for retaining the connecting lever 13 to prevent it from coming off the shaft 11. Thus, the connecting lever 13 is rotatably supported on the shaft 11.

The aforementioned arm member 13a of the connecting lever 13 forms a part of members for suspending the rear lid 8 to the front lid 7. On the other hand, the abutment portion 13b of the connecting lever 13 forms a part of members for regulating the closing and opening actions of the rear lid 8 by abutting on the tapered portion $3k_1$ of the lever guide portion 3k. At that time, the connecting lever 13 together with the rear lid 8 is biased in the clockwise direction (in the direction of arrow B) or in a lid opening direction around the shaft 11 by the torsion spring 12 which causes one end thereof to be engaged with the abutment portion 13b of the connecting lever 13 and another end thereof to be engaged with the front lid 7.

Next, the front side 8a of the rear lid 8, a main part of the present invention, facing the front lid 7 is formed into a dog-leg shape, i.e. a bottom portion of the rear lid 8 is protruding or bent toward front forming a lower end portion $8a_1$, and the rear lid 8 is suspended in parallel to the front lid 7 by means of the connecting lever 13 at the back of the front lid 7 and the magnetic tape T. When in the closing action, the lower end portion $8a_1$ of the front side 8a comes into abutment against the triangular portion $7e_1$ formed at the front lid 7, to protect the lower end of the magnetic tape T.

Specifically, the rear lid 8 has, at its central upper portion, an L-shape recess 8b defining a pin 8c projecting in the left-hand direction. The hole $13a_1$ of the aforementioned connecting lever 13 is engaged with the pin 8c in the L-shape recess 8b, so that the rear lid 8 is connected in a suspended state to the front lid 7 by means of the connecting lever 13 and is allowed to rotate on the pin 8c. At that time, the arm member 13a of the connecting lever 13 is prevented from slipping off the shaft 8c of the rear lid 8 without providing a snap ring at the distal end of the shaft 8c because pins $8e_1$, $8f_1$ as described hereafter formed with the rear lid 8 are engaged with the guide grooves $3i_1$, $3j_1$ to restrict the motion of the rear lid 8 in its longitudinal direction.

Moreover, the rear lid 8, suspended from the front lid 7 by means of the connecting lever 13 has two rotational fulcrums, this enables smooth opening and closing action of the rear lid 8.

Moreover, the rear lid 8 is integrally formed, at its back side 8d and below its middle portion, with a backward projection 8e and, at its back side 8d and in the vicinity of the right-hand side, with a projection 8f having a shape identical to that of the projection 8e. Those projections 8e and 8f are opposed to each other and formed with pins and $8f_1$ projected outward.

In assembly process, in a state where the rear lid 8 is maintaining suspended from the front lid 7 by means of the connecting lever 13, the left-hand shaft $7a_1$ of the front lid 7 is inserted in the hole $2g_1$ defined on the left-hand side 2g of the upper half member 2. After that, while the pins $8e_1$ and $8f_1$ formed at the rear lid 8 are inserted downward to (or fitted in) the paired guide grooves $3i_1$ and $3j_1$ formed in the projections 3i and 3j of the lower half member 3, the right-hand shaft $7b_1$ of the front lid 7 is interposed between the stepped portion $2h_1$ of the upper half member 2 and the stepped portion $3h_1$ of the lower half member 3. In this state, as mentioned in the foregoing, the open tops of the grooves $3i_1$, $3j_1$ are covered by the front rims $2a_1$, $2a_2$ by causing it to abut on the upper ends of the projections 3i, 3j.

Figure 5B:
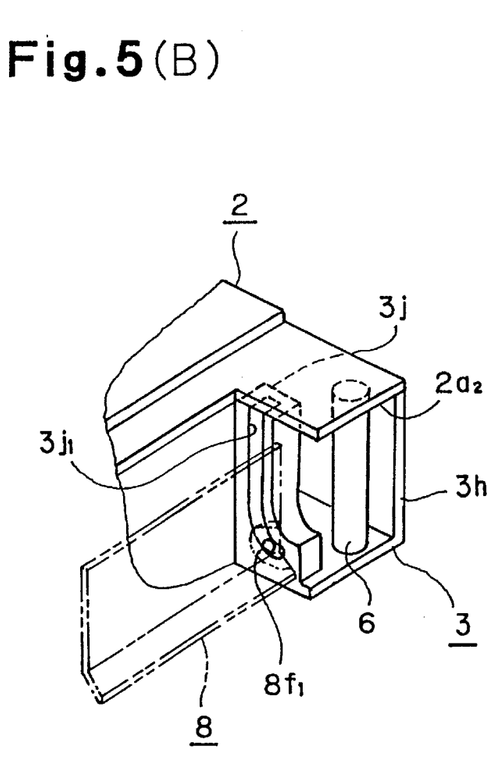
FIG. 5(B) is a partially enlarged view of the FIG. 5(A)

In this state, as shown in FIGS. 5(A) and 5(B), the rear lid 8 is assembled with and supported by the front lid 7, and these front and rear lids 7 and 8 are closed. As a result, the connecting lever 13 connecting the rear lid 8 to the front lid 7 has its abutment portion 13b abutting against the tapered portion $3k_1$ formed at the lever guide portion 3k of the lower half member 3 so that the rear lid 8 is suspended in a form of "dog-leg" shape toward the lower opening 3a by means of the connecting lever 13 where the connecting lever 13 being restricted from rotating. Moreover, the pins $8e_1$ and $8f_1$ formed on the rear lid 8 are located in their lower positions being fitted in the paired guide grooves $3i_1$ and $3j_1$.

Further, as shown in FIG. 5(A), the open top of the left-hand groove $3i_1$ is covered by the front rim $2a_1$ of the upper half member 2, on the other hand, as shown in FIG. 5(B), the open top of the right-hand groove $3j_1$ is covered by the front rim $2a_2$ of the upper half member 2. The rear lid 8 connected to the front lid 7 is supported in the opening 3a behind the magnetic tape T loaded along the rear side of the front lid 7.

Lid Opening Action of Tape Cassette of First Embodiment

Here will be described the lid opening action of the tape cassette 301 thus constructed according to the first embodiment of the present invention with reference to FIGS. 6(A) to 6(D).

Figure 6A:
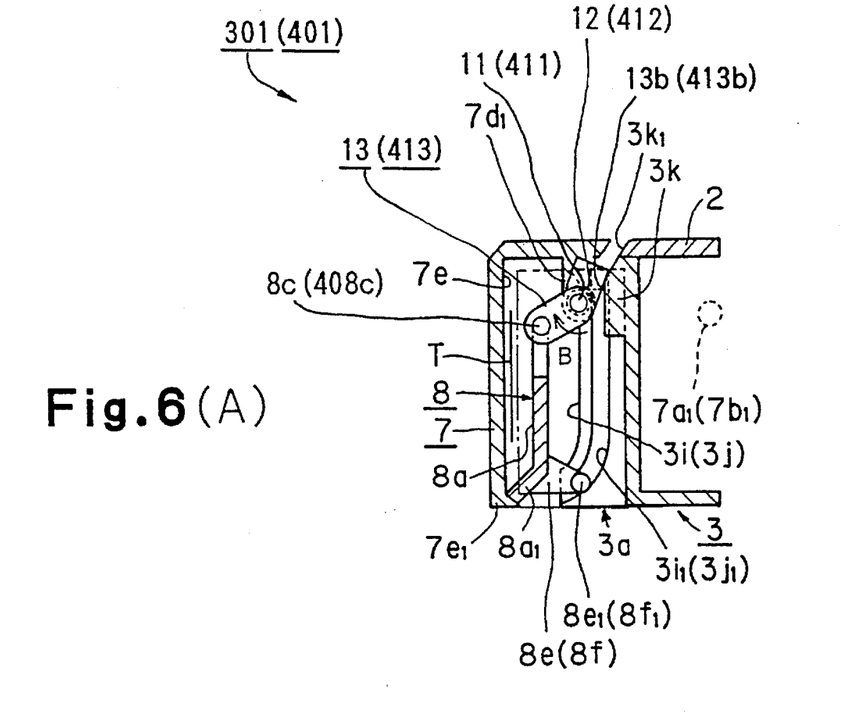
Figure 6B:
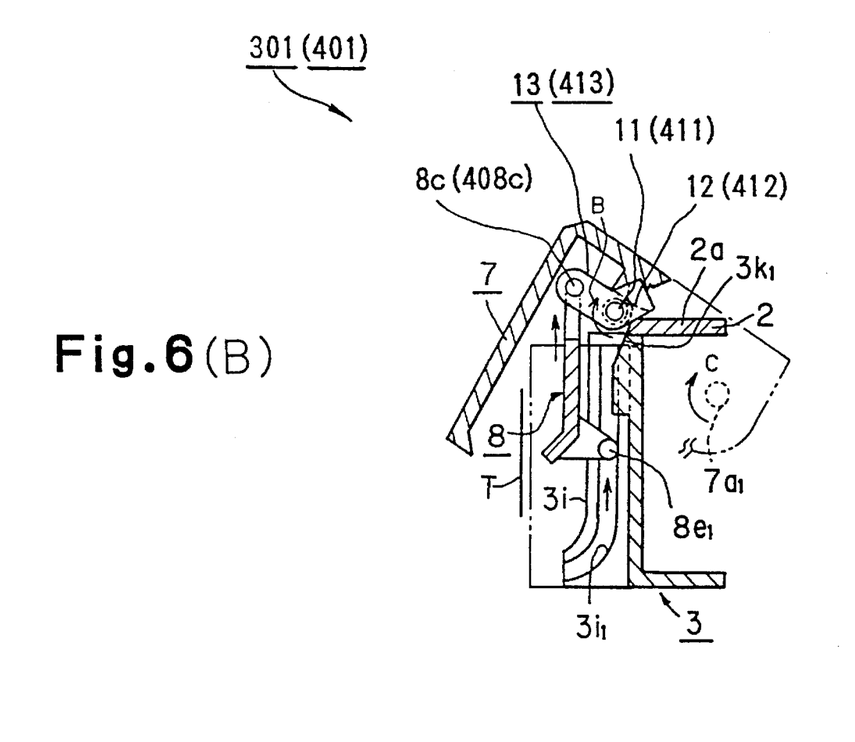
FIG. 6(B) is a side view showing the state in which the front lid and the rear lid are at interim positions.
Figure 6C:
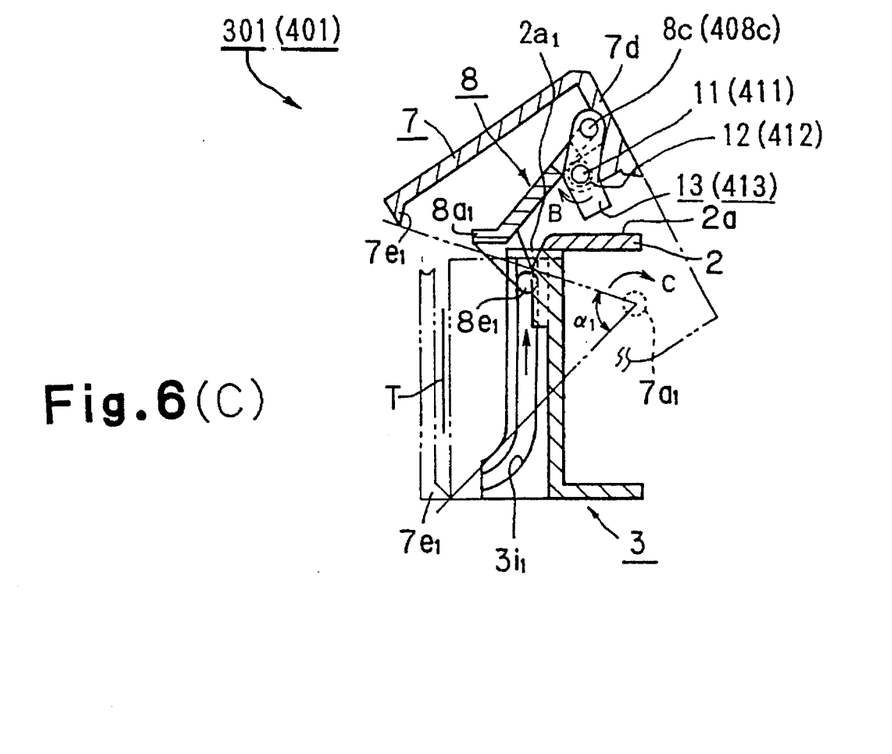
FIG. 6(C) is a side view showing the state in which the pins of the rear lid comes to upper ends of guide grooves.
Figure 6D:
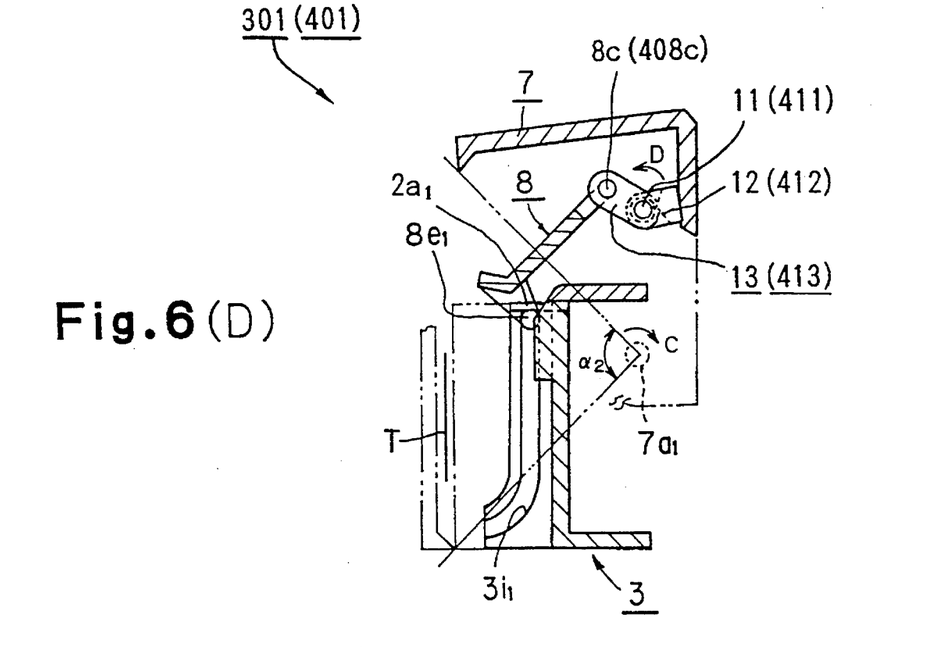
FIG. 6(D) is a side view showing the state in which the front lid and the rear lid are fully opened.

FIGS. 6(A), 6(B), 6(C) and 6(D) are vertical sections taken in the direction of arrows X and Y of FIG. 5(A) for explaining the lid opening actions of the tape cassette according to the first embodiment of the present invention. FIG. 6(A) shows the state in which the front lid and the rear lid are closed; FIG. 6(B) shows the state in which the front lid and the rear lid are at interim positions; FIG. 6(C) shows the state in which the pins of the rear lid comes to upper ends of guide grooves; and FIG. 6(D) shows the state in which the front lid and the rear lid are fully opened. Incidentally, the parenthesized reference characters appearing in FIG. 6(A) show the opposite portions, but their description will be omitted.

In the state shown in FIG. 6(A), the front lid 7 and the rear lid 8 of the tape cassette 301 of the first embodiment are closed, and the magnetic tape T is loaded along the back side 7e of the front lid 7. In the opening 3a of the lower half member 3, on the other hand, the connecting lever rotatably hinged to the shaft 11 which is fixed on the lever support portion $7d_1$ of the front lid 7, and the rear lid 8 is rotatably connected to the one end portion of the connecting lever 13 by means of its integrated pin 8c.

At this time, the connecting lever 13 is biased clockwise (i.e., in the direction of arrow B) around the shaft 11 by the torsion spring 12 but has its abutment portion 13b abutting against the tapered portion $3k_1$ of the lever guide portion 3k. As a result, the connecting lever 13 is restricted from its rotation so that the rear lid 8 is suspended by the connecting lever 13 in the vicinity of the back face of the magnetic tape T.

The pin $8e_1$ formed on the rear lid 8 is positioned in the lower position while being fitted in the guide groove $3i_1$ formed in the projection 3i of the aforementioned lower half member 3.

Moreover, the lower end portion $8a_1$ of the rear lid 8 is in close abutment against the triangular portion $7e_1$ formed at the front lid 7 so that the magnetic tape T is protected against the dust or fingerprints made through the opening 3a. Specifically, the magnetic tape T has its magnetic face covered with the front lid 7, its back face covered with the rear lid 8 and its lower end protected by the lower end portion $8a_1$ of the rear lid 8 and the triangular portion $7e_1$ formed at the front lid 7.

As a result, the magnetic tape T is completely protected between the front lid 7 and the rear lid 8 when the front lid 7 and the rear lid 8 are closed, namely before the tape cassette 301 is loaded to the (not-shown) magnetic recording and/or reproducing apparatus.

Next, when the tape cassette 301 is inserted into the magnetic recording and/or reproducing apparatus, as shown in FIG. 6(B), the front lid 7 is opened clockwise (i.e., in the direction of arrow C) on the pin $7a_1$.

Here, as the front lid 7 is opened, the abutment portion 13b of the connecting lever 13 hinged to the front lid 7 on the shaft 11 is released from its abutment against the tapered portion $3k_1$ formed at the lever guide portion 3k so that the connecting lever 13 comes into abutment against the upper side 2a of the upper half member 2 while being rotated clockwise (i.e., in the direction of arrow B) on the shaft 11 by the biasing force of the torsion spring 12. As a result, the rear lid 8 connected to the one end portion of the connecting lever 13 with the pin 8c is raised while rotating around the pin 8c, and the pin $8e_1$ formed on the rear lid 8 slides upward in the guide groove $3i_1$.

As a result, in association with the opening action of the front lid 7, the rear lid 8 suspended by the front lid 7 by means of the connecting lever 13 is also opened. However, since the connecting lever 13 is rotatably arranged to turn in the clockwise direction (i.e., in the direction of arrow B) on the shaft 11 with respect to the front lid 7 and since the rear lid 8 is rotatably arranged to turn made on the pin 8c with respect to the connecting lever 13, the rear lid 8 can be opened freely, when in the opening action, by the two fulcrums (11, 8c) of rotation so that it can achieve two phases of freedom in the link mechanism.

Moreover, on the other hand, since the triangular portion $7e_1$ of the front lid 7 is moved apart, when the front lid 7 and the rear lid 8 are opened, from the magnetic face of the magnetic tape T, whereas the lower end portion $8a_1$ of the rear lid 8 is kept away from contact with the back face of the magnetic tape T because the pin $8e_1$ is guided by the guided groove $3i_1$.

Next, when the front lid 7 is further opened clockwise (i.e., in the direction of arrow C) on the pin $7a_1$ from the state of FIG. 6(B) as shown in FIG. 6(C), i.e., a first open position state having a smaller open angle $\alpha_1$, the pin $8e_1$ of the Fear lid 8 associated with the front lid 7 comes to approximately the end of the guide groove $3i_1$. This first open position can be applied to the apparatus of the type such as a portable or video movie apparatus in which the open angle $\alpha_1$ of the front lid 7 cannot be set to a large value.

Specifically, in the state shown in FIG. 6(C), with the opening action of the front lid 7, the connecting lever 13 reaches above the upper side 2a of the upper half member 2 while being rotated further clockwise (i.e. in the direction of arrow B) on the shaft 11 by the biasing force of the torsion spring 12, and the end portion of the connecting lever 13 supporting the rear lid 8 comes into abutment of the back side of the upper side 7d of the front lid 7. On the other hand, the rear lid 8 connected to the one end portion of the connecting lever 13 by means of the pin 8c is further raised while being rotated on the pin 8c and so that the pin $8e_1$ formed on the rear lid 8 reaches the upper portion in the guide groove $3i_1$. At this time, as in foregoing description, the front lid 7 and the rear lid 8 are opened without any contact with the magnetic tape T, and the rear lid 8 suspended by the front lid 7 by means of the connecting lever 13 is given more degrees of freedom by the two fulcrums of rotation (11, 8c). As a result, the rear lid 8 is lifted without causing problems to the vicinity of the back side of the upper side 7d of the front lid T, and the open angle $\alpha_1$ of the front lid 7 can be set to a small value.

Next, when the front lid 7 is opened further in the clockwise direction (i.e.,in the direction of arrow C) from the state of FIG. 6(C) on the pin $7a_1$, as shown in FIG. 6(D), it takes a second open position state having a larger open angle $\alpha_2$, and the rear lid 8 associated with the front lid 7 is also opened. This second open state can be applied to the apparatus of the type such as a large-sized video deck or apparatus for professional use, in which the open angle $\alpha_2$ of the front lid 7 can be set to a large value.

Specifically, in the state shown in FIG. 6(D), since the upper portion of the guide groove $3i_1$ is covered by the front rim $2a_1$ of the upper half member 2, the pin $8e_1$ of the rear lid 8 is held in a state where it abuts on the front rim $2a_1$ of the upper half member 2. Thus, the rear lid 8 operated in association with the front lid 7 is held in a position where it is not allowed to open any more.

On the other hand, only the front lid 7 can be further opened at a larger angle even though the rear lid 8 is held in the position where it is restricted to open. Specifically, in the opening action of the front lid 7, the shaft 11 as a rotating fulcrum moves in the right-hand direction and a portion on the shaft 80 at one end of the connecting lever 13 undergoes a force in the left-hand direction from the rear lid 8, so that the portion of the shaft 8c rotates the connecting lever 13 on the shaft 11 in the counterclockwise direction (in the direction of arrow D) against a biasing force of the torsion spring 12. Thus, the front lid 7 is further opened in the clockwise direction (in the direction of arrow C). As a result, the open angle $\alpha_2$ of the front lid 7 can be set to a large value as mentioned in the foregoing.

At this time, the pin $8e_1$ provided on the rear lid 8 is prevented from coming off the guide groove $3i_1$ upward by the front rim $2a_1$ of the upper half member 2. Thus, it enables to open the front and rear lids 7, 8 sufficiently, which contributes to improve the reliability and quality of the tape cassette 301. Incidentally, when the front and rear lids 7, 8 are closed, the closing action can be reversed from the aforementioned ones, i.e., in the order of FIG. 6(D), FIG. 6(C), FIG. 6(B), and FIG. 6(A), and their detail is omitted. As a result, according to the present invention, the magnetic tape T positioned between the front lid 7 and the rear lid 8 is protected against invasion of dust and fingerprints and further against foreign objects when the tape cassette 301 is not mounted on the recording and/or reproducing apparatus, and when the tape cassette is mounted in the apparatus, the rear lid 8 is more easily opened and closed because the rear lid 8 suspended by the front lid 7 through the connecting lever 13 is given a more degree of freedom compared with the foregoing prior art such as 8 mm tape cassette 200 wherein the rear lid is directly suspended on the front lid 7.

Further, the tape cassette 301 is constructed in such a manner that the guide grooves $3i_1$, $3j_1$ for being engaged with the pins $8e_1$, $8f_1$ of the rear lid 8 are covered with the front rims $2a_1$, $2a_2$ of the upper half member, so that the rear lid 8 is prevented from coming off the guide grooves $3i_1$, $3j_1$ in the lid opening direction even when the front lid 7 is opened at a large angle, which enables applying in the apparatus of the type such as the large sized video deck or the apparatus for professional use.

Incidentally, the aforementioned tape cassette 301 of the first embodiment is equipped with only one connecting lever 13 for connecting the rear lid 8 to the front lid 7 and only one lever guide portion 3k for restricting a movement of the connecting lever 13. However, the connecting lever 13 and the lever guide portion 3k should not be limited thereto, but sets may be provided in the vicinity of the right-hand and left-hand two ends of the rear lid 8. In addition, the paired guide grooves $3i_1$ and $3j_1$ for fitting therein the pins $8e_1$ and $8f_1$ formed on the rear lid 8 may also be located in the vicinity of the right-hand and left-hand ends of the rear lid 8.

Moreover, in the tape cassette 301 of the first embodiment, the bias means for biasing the rear lid 8 suspended by the connecting lever 13 in the opening direction is exemplified by biasing the connecting lever 13 clockwise (i.e., in the direction of arrow B) by the torsion spring 12 to bias the rear lid 8 in the opening direction. However, the bias means should not be limited to the one as shown, but can be exemplified by equipping the rear lid 8 directly with a biasing element which corresponds to the torsion spring 12.

Construction and Lid Opening Action of Tape Cassette according to Second Embodiment Here will be described the construction and lid opening actions of a tape cassette according to a second embodiment of the present invention with reference to FIGS. 7(A) to 7(B) and FIG. 8.

Figure 7A:
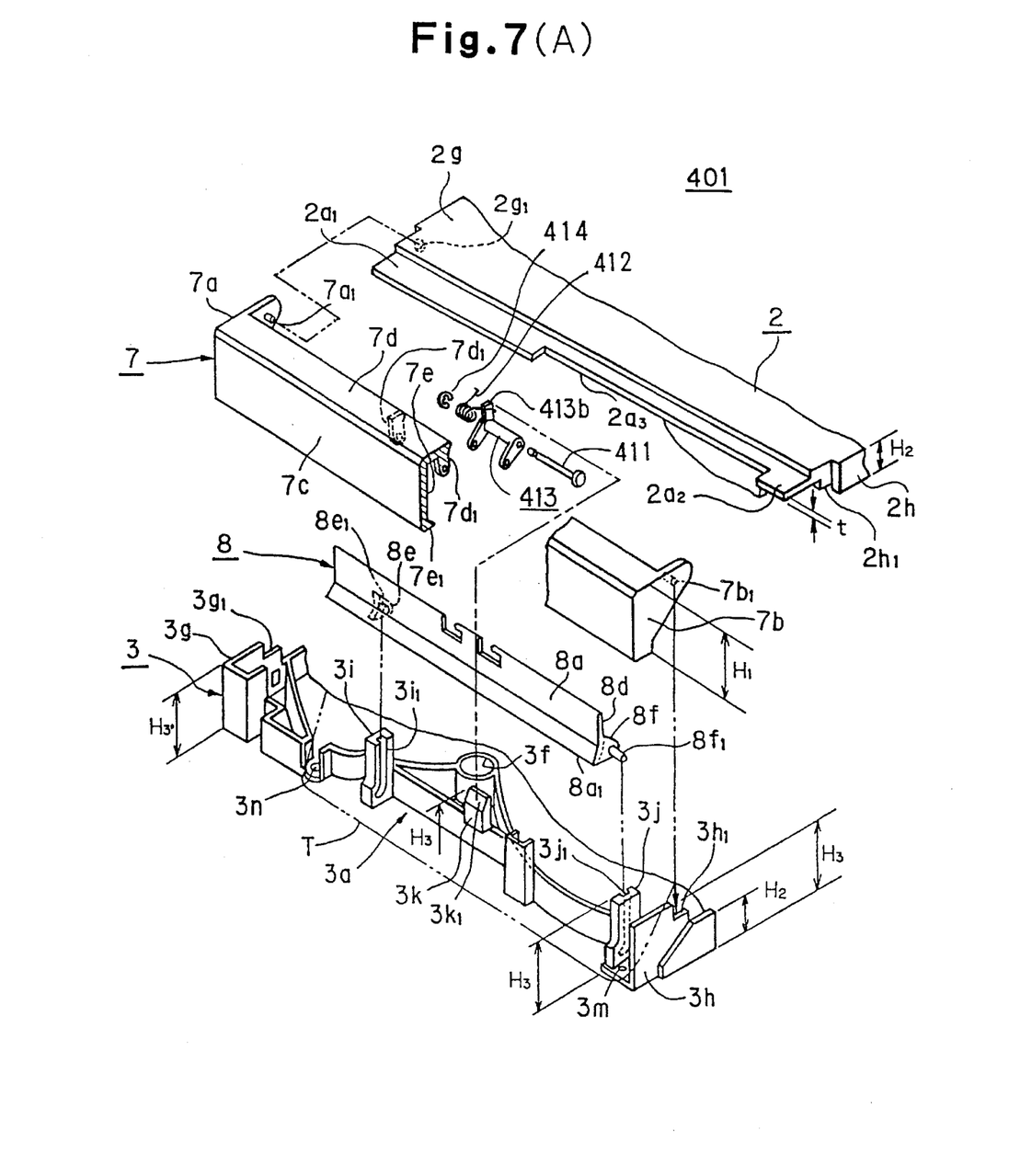
FIG. 7(A) is partially broken, an exploded perspective view of the area in the vicinity of a front lid and a rear lid constituting an essential portion of the tape cassette according to the second embodiment of the present invention.

FIG. 7(A) is, partially broken, an exploded perspective view of the area in the vicinity of a front lid and a rear lid constituting an essential portion of the tape cassette according to the second embodiment of the present invention; FIG. 7(B) is a partially enlarged perspective view of FIG. 7(A).

The tape cassette 401 according to the second embodiment of the present invention has a construction similar to that of the aforementioned tape cassette 301 of the first embodiment excepting a portion. Here, for a convenience of description, the same components as those described are designated with common reference characters, and their detailed descriptions are omitted. The aforementioned components are suitably described, where necessary, and the components different from those of the prior art designated with new reference characters are described. Incidentally, the auxiliary characters (suffice) attached to the components newly designated are identical to those attached to the foregoing components.

Figure 7B:
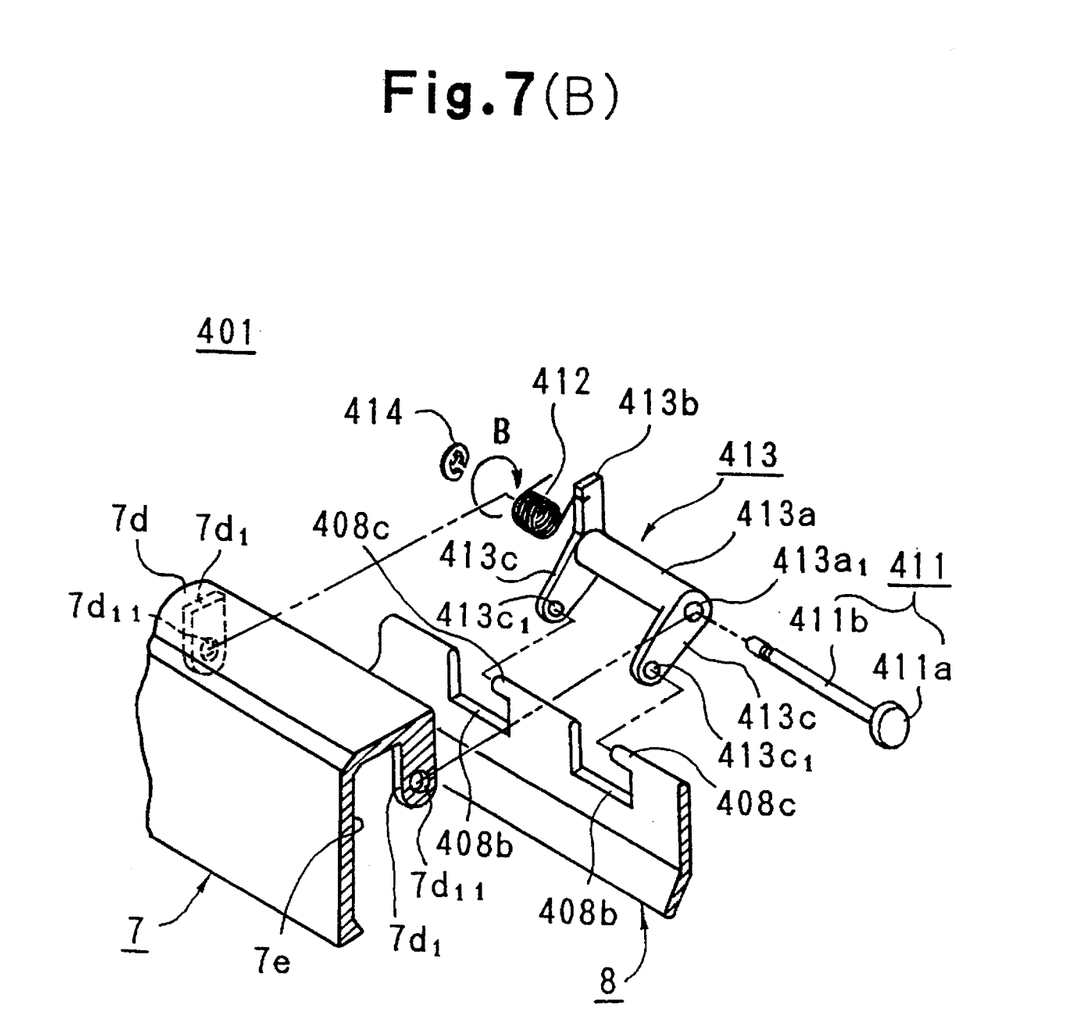
FIG. 7(B) is a partially enlarged perspective view of FIG. 7(A)

Referring to FIG. 7(A) and 7(B), this second embodiment is different from the first embodiment in that the rear lid 8 is rotatably suspended on the front lid 7 by using a connecting lever 413, wherein the connecting lever 413 is rotatably supported by a first level posture holding device on the front lid 7 so as to be in parallel to the front lid 7, and the rear lid 8 is rotatably supported by a second level posture holding devices so as to be in parallel to the front lid 7.

In short, the difference resides in that the rear lid 8 is rotatably suspended on the front lid 7 so as to be in parallel to the front lid 7 by using the connecting lever 413 in cooperation with the first and second level posture holding devices.

Moreover, a pair of lever support portions $7d_1$, $7d_1$ of the front lid 7 are protrudingly provided downward at the back side of the center portion of the front lid 7 with a predetermined distance apart facing to each other. The connecting lever 413 of the second embodiment of the present invention is rotatably supported between the pair of lever support portions $7d_1$, $7d_1$ by using a shaft 411. The connecting lever 413 is adopted for increase of the degree of freedom regarding the opening and closing action of the rear lid 8 as mentioned in the foregoing first embodiment.

Specifically, referring to FIG. 7(B), the pair of lever support portions $7d_1$, $7d_1$ of the front lid 7 is respectively provided with a hole $7d_{11}$ approximately at a lower end thereof in such a manner that each of the holes $7d_{11}$, $7d_{11}$ has a common center line which is in parallel to the front lid 7.

On the other hand, the connecting lever 413 is integrally made of resin in an U-letter shape. The connecting lever 413 generally comprises a supporting part 413a having a predetermined length with a long hole $413a_1$ defined at a center thereof in the longitudinal direction, an abutment portion 413b protrudingly provided upward at the left-hand side of the supporting part 413a and a pair of arm members 413c, 413c protrudingly provided obliquely downward (side view) at both ends of the supporting part 413a, with a distance facing to each other. Further, holes $413c_1$, $413c_1$ are respectively defined at distal ends of the pair of the arm members 413c, 413c in such a manner that each of the holes $413c_1$, $413c_1$ has a common center line which is in parallel to the longitudinal direction of the front lid 7.

The aforementioned abutment portion 413b forms one of members for regulating the closing action of the rear lid 8 by abutting against the tapered portion $3k_1$ of the lever guide portion 3k. On the other hand, the pair of arm members 413c, 413c forms one of members for suspending the rear lid 8 in parallel to the front lid 7.

In assembly, after a torsion spring 412 and the connecting lever 413 are interposed in this order from the left-hand side between the pair of lever support portions $7d_1$, $7d_1$ of the front lid 7, a shaft 411 having a lager diameter portion 411a and a smaller diameter portion 411b is inserted from the smaller diameter portion thereof from the right-hand side, into the right-hand hole $7d_{11}$ of the right-hand lever support portion $7d_1$, the long hole $413a_1$ of the connecting lever 413, the torsion spring 412 and the left-hand hole $7d_{11}$ of the left-hand lever support portion $7d_1$ and an end portion of the smaller diameter portion 411b is fitted with a snap ring 414 for retaining the connecting lever 413. Thus, the connecting lever 413 is rotatably supported at the shaft 411 in such a manner that the supporting part 413a is in parallel to the front lid 7. As mentioned in the foregoing, members for holding the connecting lever 8 in parallel to the front lid 7 is referred to as first level posture holding device. In this embodiment, the first level posture holding device comprises the pair of lever support portions $7d_1$, $7d_1$ provided on the front lid 7, the shaft 411, and the long hole $413a_1$ defined in the supporting part 413a of the connecting lever 413, however, these elements should not be limited to the ones as shown, but can be exemplified by other elements which realize to hold the connecting lever 413 in parallel to the longitudinal direction of the front lid 7. At that time, one end of the torsion spring 412 is engaged with the abutment portion 413b of the connecting lever 413 and another end thereof is secured with the front lid 7. Thus, the connecting lever 413 together with the rear lid 8 which is suspended on the front lid 7 as described hereafter, is biased in the clockwise direction (in the direction of arrow B) or in a lid opening direction around the shaft 411 by the torsion spring 412.

The rear lid 8, one of the main component of the second embodiment of the present invention, is formed in the "dog leg" shape and is suspended in parallel to the front lid 7 at the back side thereof by using the connecting lever 413. The rear lid 8 has a shorter length than that of the front lid 7 corresponding to the opening 3a defined in the lower half member 3. In a closed position, the rear lid 8 is positioned in front of the opening 3a and its end portion $8a_1$ abuts on the triangular portion $7e_1$ of the front lid 7. Thus, the magnetic tape T is protected between the front lid 7 and the rear lid 8.

Moreover, the rear lid 8 has a pair of recesses 408b, 408b, each having a key shape, approximately at the center thereof. A shaft 408c is integrally formed with the rear lid 8 and protrudes into each of the pair of the recesses 408b, 408b in such a manner that it protrudes from the inner wall of the recess 408b in the left-hand direction.

Figure 8:
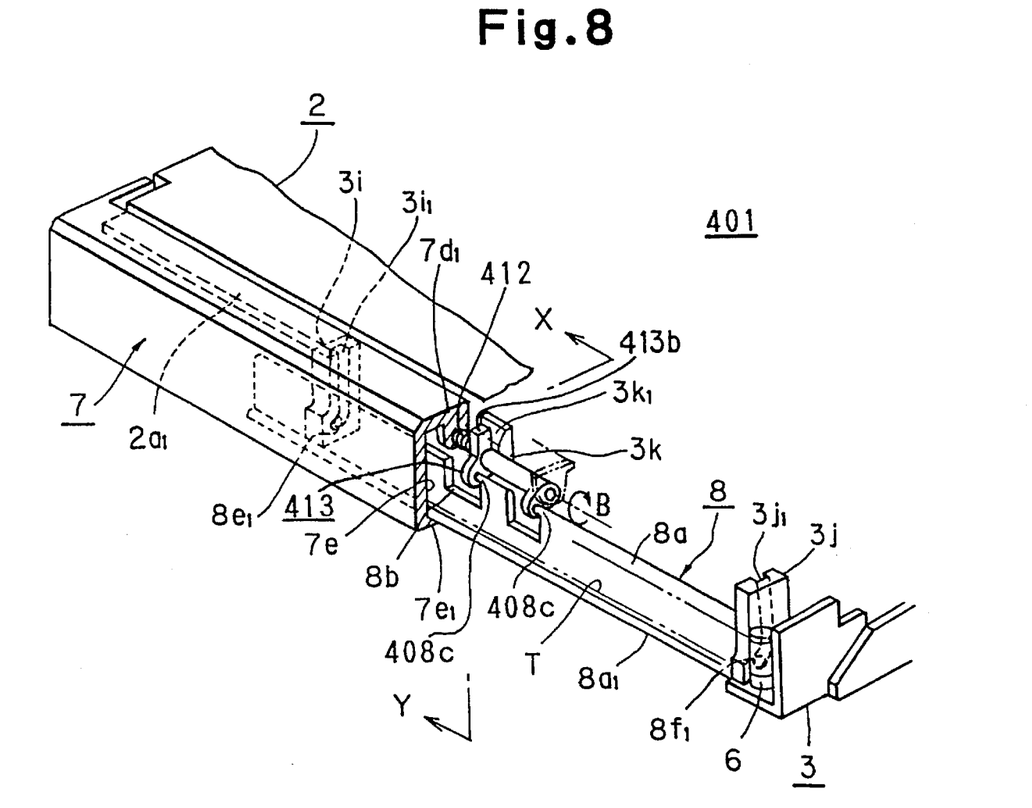
FIG. 8 is a partially broken perspective view, in an assembled state, of the area in the vicinity of the front lid and the rear lid constituting the essential portion of the tape cassette according to the second embodiment of the present invention.

FIG. 8 is a partially broken perspective view in an assembled state of the area in the vicinity of the front lid and the rear lid constituting the essential portion of the tape cassette according to the second embodiment of the present invention.

Referring to FIG. 8, in assembly process, as mentioned in the foregoing, the connecting lever 413 is supported on the front lid 7 parallel thereto, thus the rear lid 8 is supported rotatably and in parallel to the front lid 7 by the connecting lever 413 by causing the pair of shafts 408c, 408c of the rear lid 8 to insert into the pair of the holes 413$c_1$, 413$c_1$ defined in the pair of the arm members 413c, 413c of the connecting lever 413.

At that time, since the pair of holes 413$c_1$, 413$c_1$ are formed to have a common center line at a predetermined distance, the pair of the holes 413$c_1$, 41$c_1$ is substantially equivalent to a hole which has a long fitting length. Thus, it is able to shorten the length of the pair of shafts 408c, 408c of the rear lid 8. Further, the pair of pins 8$e_1$, 8$f_1$ provided at each side of the rear lid 8 are fitted into the pair of the guide grooves 3$i_1$, 3$j_1$ so that the shafts 408c, 408c are prevented from coming off the holes 413$c_1$, 413$c_1$ of the connecting lever 413 without providing the snap rings at the ends of the shafts 408c, 408c. Further, as mentioned in the first embodiment, the guide grooves 3$i_1$, 3$j_1$ are covered by the front rims 2$a_1$, 2$a_2$ of the upper half member 2.

As mentioned in the foregoing, the members for holding the rear lid 8 in parallel to the front lid 7 through the connecting lever 413 are referred to as second level posture holding device.

In this embodiment, the second level posture holding device comprises the pair of holes 413$c_1$, 413$c_1$ defined in the pair of arm members 413c, 413c and the pair of the shafts 408c, 408c, however, these elements should not be limited to the ones as shown, but can be exemplified by other elements which realize to hold the rear lid 8 in parallel to the front lid 7 through the connecting lever 413.

Thus it will be understood that the connecting lever 413 is rotatably supported in parallel to the front lid 7 by means of the first level posture holding device, on the other hand, the rear lid 8 is rotatably supported in parallel to the connecting lever 413 by means of the second level posture holding device, so that the rear lid 8 is rotatably supported in parallel to the front lid 7. This enables holding the rear lid 8 in an ideal posture and smooth operations at opening and closing actions of the rear lid, especially, thanks to the provision of the two fulcrums (411, 408c) of the rotation.

Moreover, the rear lid 8 is integrally formed, at its back side 8d and below its middle portion, with a backward projection 8e and, at its back side 8d and in the vicinity of the right-hand side, with a projection 8f having a shape identical to that of the projection 8e. Those projections 8e and 8f are opposed to each other and formed with pins 8$e_1$ and 8$f_1$ projected outward.

In assembly process, in a state where the rear lid 8 is maintained suspended on the front lid 7 by means of the connecting lever 413, the left-hand shaft 7$a_1$ of the front lid 7 is inserted in the hole 2$g_1$ defined at the left-hand side 2g of the upper half member 2. After that, while the pins 8$e_1$ and 8$f_1$ formed at the rear lid 8 are inserted downward to (or fitted in) the paired guide grooves 3$i_1$ and 3$j_1$ formed in the projections 3i and 3j of the lower half member 3, the right-hand shaft 7$b_1$ of the front lid 7 is interposed between the stepped portion 2$h_1$ of the upper half member 2 and the stepped portion 3$h_1$ of the lower half member 3. In this state, as mentioned in the foregoing, the open tops of the grooves 3$i_1$, 3$j_1$ are covered by the front rims 2$a_1$, 2$a_2$ by causing them to abut on the upper ends of the projections 3i, 3j.

In this state, as shown in FIGS. 8 and 5(B), the rear lid 8 is assembled with and supported by the front lid 7, and these front and rear lids 7 and 8 are closed. As a result, the connecting lever 413 for connecting the rear lid 8 to the front lid 7 has its abutment portion 413b abutting against the tapered portion 3$k_1$ formed at the lever guide portion 3k of the lower half member 3 so that the rear lid 8 is suspended in a form of "dog-leg" shape toward the lower opening 3a by means of the connecting lever 413, where the connecting lever 413 being restricted from rotating. Moreover, the pins 8$e_1$ and 8$f_1$ formed on the rear lid 8 are located in their lower positions being fitted in the paired guide grooves 3$i_1$ and 3$i_1$.

Further, as shown in FIG. 8, the open top of the left-hand groove 3$i_1$ is covered by the front rim 2$a_1$ of the upper half member 2, on the other hand, as shown in FIG. 5(B), the open top of the right-hand groove 3$j_1$ is covered by the front rim 2$a_2$ of the upper half member 2. The rear lid 8 connected to the front lid 7 is supported in the opening 3a behind the magnetic tape T loaded along the rear side of the front lid 7.

Next, the description is given to the operation of the tape cassette 401 of the second embodiment.

When the tape cassette 401 is inserted into the (not-shown) magnetic recording and/or reproducing apparatus, the front lid 7 is opened clockwise (i.e., in the direction of arrow C), as mentioned in the first embodiment referring to FIG. 6(B), on the pin 7$a_1$.

The subsequent actions are generally similar to the aforementioned ones referring to the FIGS. 6(B) to 6(D). By the rotation of the connecting lever 413 (13), the rear lid 8 connected to the arm members 413c, 413c of the connecting lever 413. (13) by means of the pins 408c, 408c (8c) is lifted while rotating on the pins 408c, 408c and the pins 8$e_1$; 8$f_1$ formed on the rear lid 8 slide upward in the guide grooves 3$i_1$, 3$j_1$. Then, the state, as shown in FIG. 6(C), is taken when the front lid 7 and the rear lid 8 are completely opened i.e., a first open position state having a smaller open angle $\alpha_1$, the pin 8$e_1$ of the rear lid 8 associated with the front lid 7 comes to approximately the end of the guide groove 3$i_1$. This first open position can be applied to the apparatus of the type such as the portable or video movie apparatus in which the open angle $\alpha_1$ of the front lid 7 cannot be set to a large value.

In the open state of the front lid 7 and the rear lid 8, as shown in FIG. 6(C), the rear lid 8 suspended by the front lid 7 by means of the connecting lever 413 (13) is given as explained before the increased degrees of freedom by the two fulcrums of rotation (411, 408c). As a result, the pins 408c, 408c connected to the end portions of the connecting lever 413 are lifted without difficulty to the vicinity of the back side of the upper side 7d of the front lid 7 so that the open angle $\alpha_1$ of the front lid 7 can be set to a small value.

Next, when the front lid 7 is opened further in the clockwise direction (i.e., in the direction of arrow C) from the state of FIG. 6(C) on the pin 7$a_1$, as shown in FIG. 6(D), it takes a second open position state having a larger open angle $\alpha_2$, and the rear lid 8 associated with the front lid 7 is also opened. This second open state can be applied to the apparatus of the type such as a large-sized video deck or apparatus for professional use, in which the open angle $\alpha_2$ of the front lid 7 can be set to a large value.

As a result, the tape cassette 401 of the second embodiment can achieve effects similar to those of the tape cassette 301 of the first embodiment.

What is claimed is:

1. A tape cassette having a casing including an opening for accepting tape loading members of a magnetic recording and/or playing apparatus, a pair of reels disposed in said casing for winding a magnetic tape on said pair of reels and threading the magnetic tape along a front of said opening, a front lid disposed in openable/closable manners at the front of said casing for protecting one surface of the magnetic tape and a rear lid disposed over said opening and at a back of said front lid for protecting another surface of said magnetic tape, wherein said tape cassette comprises:

pin means provided on said rear lid;

guide groove means provided on a lower half member of said casing for guiding said rear lid in opening and closing directions of the rear lid by being slidably fitted with said pin means of the rear lid, said guide groove means having an open top;

a front rim member provided on an upper half member of said casing for covering said open top of the guide groove means in an assembly state of the tape cassette;

a connecting lever pivotally mounted on a shaft supported on a support portion which is formed at the back of said front lid, said rear lid being suspended on the connecting lever;

bias means for biasing said rear lid suspended from said connecting lever in a rear lid opening direction; and regulating means formed in said casing for regulating an opening action of said rear lid biased by said bias means when said front lid and said rear lid are closed, whereby said rear lid is opened in association with an opening action of said front lid as such that said front lid opens to a first degree upon said pin means reaching a position of the open top of said guide groove means, and said front lid alone opens further to a second degree which is larger than the first degree by an action of said connecting lever.

2. A tape cassette as claimed in claim 1, wherein said front rim member comprises at least a thin plate integrally provided with the upper half member.

3. A tape cassette having a casing including an opening for accepting tape loading members of a magnetic recording and/or playing apparatus, a pair of reels disposed in said casing for winding a magnetic tape on said pair of reels and threading the magnetic tape along a front of said opening, a front lid disposed in openable/closable manners at the front of said casing for protecting one surface of the magnetic tape and a rear lid disposed over said opening and at a back of said front lid for protecting another surface of said magnetic tape, wherein said tape cassette comprises, pin means provided on said rear lid;

connecting lever means disposed between said front lid and said rear lid for rotatably connecting said front lid and said rear lid, said connecting lever means being rotatably supported on said front lid substantially parallel to a longitudinal direction of said front lid by first level posture holding means, said rear lid being rotatably suspended on the connecting lever means in parallel to the front lid by second level posture holding means at the back of said front lid;

guide groove means provided on a lower half member of said casing for guiding said rear lid in opening and closing directions of the rear lid by being slidably fitted with said pin means of the rear lid, said guide groove means having an open top;

a front rim member provided on an upper half member of said casing for covering said open top of said guide groove means in an assembled state of said tape cassette;

bias means for biasing said rear lid suspended from said connecting lever in a rear lid opening direction; and regulating means formed in said casing for regulating an opening action of said rear lid biased by said bias means when said front lid and said rear lid are closed, whereby said rear lid is opened in association with an opening action of said front lid so that said front lid opens to a first degree upon said pin means reaching a position of the open top of said guide groove means, and said front lid alone opens further to a second degree which is larger than said first degree by an action of said connecting lever.

4. A tape cassette as claimed in claim 3, wherein said first level posture holding means comprises a pair of lever support members provided on the front lid, a long hole defined in a supporting part provided on said connecting lever means and a shaft for rotatably supporting the connecting lever means substantially parallel to the front lid engaging with said pair of lever support members by inserting the shaft into said long hole of the connecting lever means.

5. A tape cassette as claimed in claim 3, wherein said second level posture holding means comprises a pair of holes defined respectively in a pair of arm members protrudingly provided on said connecting lever means, a pair of recesses defined in said rear lid and a pair of pins protruding into said pair of recesses respectively for rotatably suspending the rear lid by inserting the pair of pins respectively into said pair of holes of said connecting lever means.

* * * * *